Figure 1:
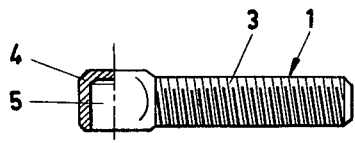

Oct. 25, 1966  L. HOLMSTRÖM  3,280,447
METHOD OF PRODUCING HINGES AND HINGES PRODUCED BY THE METHOD
Filed Sept. 17, 1965

INVENTOR.
Lars Holmström
BY
Stevens, Davis, Miller & Mosher
Attorneys

3,280,447
METHOD OF PRODUCING HINGES AND HINGES PRODUCED BY THE METHOD

Lars Helmström, Turku, Finland, assignor to OY Fiskars AB, Abo, Finland
Filed Sept. 17, 1965, Ser. No. 488,214
Claims priority, application Finland, Feb. 18, 1965, 392/65
2 Claims. (Cl. 29—11)

This invention relates to a method of producing a hinge for doors, windows and the like, which hinge consists of at least two screw-shaped hinge-halves and a hinge pin for connecting the halves together.

Hinges of the above kind are already known, in which hinges the halves are produced by means of pressure casting, whereby the threaded portions of the pins are formed into conical wood screws or into screws with a relatively great pitch or in such a way that the hinge halves are by means of turning provided with cylindrical threads, in which case the threaded portion of the hinge-half and the head part generally are produced as separate parts, which by soldering, screwing or in the like manner are secured to another and thus forming a hinge-half.

It has, however, been observed that the hinges manufactured according to the above stated method do not have the required rigidity and strength in considering the limited diameter of the threaded portions, which limited diameter is essential for mounting of the hinges on standardized doors with rabbets or on large windows, kitchen furnishings and other building elements. The lack of necessary strength causes deformations in the hinges and thus result damages due to displacements of the hinged objects. The object of the present invention is to eliminate the above stated disadvantages and the method according to the invention is mainly characterized in that each of the hinge-halves is made in one piece of a bar material, which halves by means of cold-rolling are formed with a thread, one of its end portions being formed by a cold upsetting method into a head for the hinge pin. Before rolling of the threads takes place, the tensile strength of the hinge-halves can be further increased by reduction of the diameter of the bar portion to be threaded by a cold reduction process without having to cut away any of the material.

The above cold-forming being carried out without cutting away any of the material from the hinge-halves, with their threaded portions and the head in one piece, provides the necessary strength for the fastening arms even with a sufficiently small diameter suitable for fixing the hinge on standard doors and windows. The hinge made according to the invention is also much stronger than the corresponding cast or turned types and has even with the limited diameters of the fastening arms proved to be sufficiently rigid to counteract twisting and displacements. The hinge is most adaptable especially for mechanical mounting in serial production of building elements.

Figure 2:
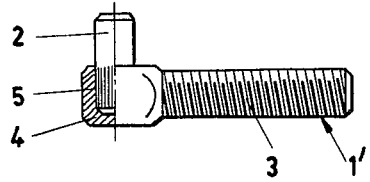
Figure 3:
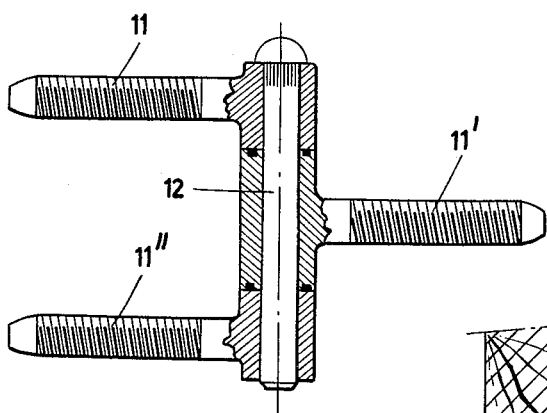
Figure 4:
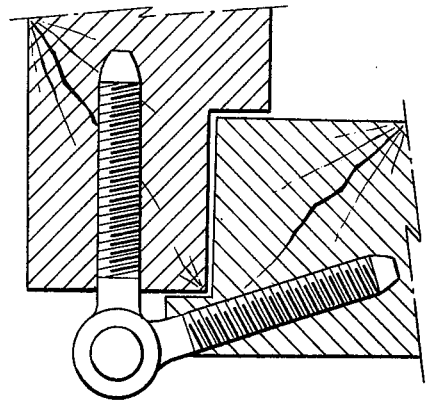

The invention is further described by the following specification and the accompanying drawing, in which FIGURE 1 shows an embodiment of a hinge according to the invention in a partial section, with both hinge-halves separated, as seen from the side, FIGURE 2 shows a top view of the hinge, FIGURE 3 shows an embodiment of a hinge with three hinge parts in an axial section, as seen from the side, and FIGURE 4 shows the hinge according to FIGURE 3 in its mounted position.

The hinge according to FIGS. 1 and 2 comprises two hinge-halves 1 and 1' and a pin 2 connecting these halves. Each of the hinge-halves is made in one piece of bar material, which by means of cold-rolling are formed and provided with a thread 3 of a fairly fine pitch, e.g. such as used for metal screws, in order to render it possible to make an exact adjustment of the screwing depth and which by means of a cold upsetting method is formed to a square head part 4 with suitably rounded corners for mechanized tightening. The thus formed square head is provided with a through-passing hole 5, and the hinge pin 2 is pressed into the head of one of the hinge-halves 1'. The opposite end of the hinge pin is rotating freely in the corresponding bored hole 5 of the other hinge-half 1.

The hinge shown in FIG. 3 differs from the embodiment shown in FIGURES 1 and 2 mainly only in that the hinge contains hinge parts 11, 11' and 11" and a single through-passing hinge pin 12. As to their manufacture the individual hinge parts can in general be considered similar with the here above specified hinge-halves. In order to eliminate squeaking and wear between the hinge-parts there is arranged between the parts slide-rings of a type known per se.

The mounting is carried out as illustrated in FIGURE 4 by boring holes into the frames and sashes with a drilling jig, into which holes the hinge-halves are screwed as an ordinary screw either with a hand tool or by means of an automatic screw fastener.

The drawing and the corresponding specification are of course only intended to illustrate the inventive idea of the invention. The hinges may thus as to their details vary considerably within the scope and limits of the following claims. They may thus be provided with different threading, for example with conical threads, rough or fine threads, wood or similar threads, or with threads of different pitch, and the heads may be of different form.

What I claim is:

1. A method for producing a hinge for doors, windows and the like, which hinge consists of at least two screw-shaped hinge-halves and a hinge pin for connecting the halves together, characterized therein that each of the hinge-halves are made in one piece of a bar material, which halves by means of cold-rolling are formed with a thread, one of its end portions being by a cold-upsetting method formed into a head for the hinge pin.

2. A hinge, characterized therein that it is made by the method according to claim 1.

No references cited.

RICHARD H. EANES, JR., *Primary Examiner.*